United States Patent

[11] 3,620,653

| [72] | Inventors | Eber W. Gaylord<br>Pittsburgh;<br>Ernest A. Mori, Hampton Township, both of Pa. |
|---|---|---|
| [21] | Appl. No. | 887,612 |
| [22] | Filed | Dec. 23, 1969 |
| [45] | Patented | Nov. 16, 1971 |
| [73] | Assignee | Gulf Research & Development Company<br>Pittsburgh, Pa.<br>Continuation-in-part of application Ser. No. 723,996, Apr. 25, 1968, now Patent No. 3,561,822. This application Dec. 23, 1969, Ser. No. 887,612 |

[54] APPARATUS FOR CONTROLLING SOLIDS-LADEN LIQUIDS
14 Claims, 6 Drawing Figs.

[52] U.S. Cl. ........................................ 417/568,
137/519.5, 251/334
[51] Int. Cl. .......................................... F04b 21/02,
F16k 17/00, F16k 1/00
[50] Field of Search ........................................ 417/900,
566, 567, 568; 251/334, 310; 137/519.5

[56] References Cited
UNITED STATES PATENTS

| 862,867 | 8/1907 | Eggleston | 417/390 |
|---|---|---|---|
| 3,298,319 | 1/1967 | Savage | 417/900 X |
| 3,346,008 | 10/1967 | Scaramucci | 251/334 X |

Primary Examiner—Robert M. Walker
Attorneys—Meyer Neishloss, Deane E. Keith and Paul L. Tillson ABSTRACT: A reciprocating pump for handling abrasive-laden liquids has ball-type inlet and outlet valves. An inlet valve is disclosed mounted directly on the pump cylinder in a position such that the valve plug moves substantially into the opening in the cylinder wall when the valve is in an open position to minimize the length of the passage from the valve seat into the pump. The valve has a spherical valve plug that moves in response to the pressure differential of the liquid handled to and from a closed position on a valve seat. An elastomeric seal ring precompressed to a pressure of at least 1,000 p.s.i. is positioned at the outlet end of the valve seat to engage the valve plug. In one embodiment of the invention, a lip extends around the outlet edge of the seal and in another the elastomeric seal is a composite of a ring of hard elastomeric material and a ring of a relatively soft elastomeric material.

PATENTED NOV 16 1971

INVENTORS.
EBER W. GAYLORD
ERNEST A. MORI

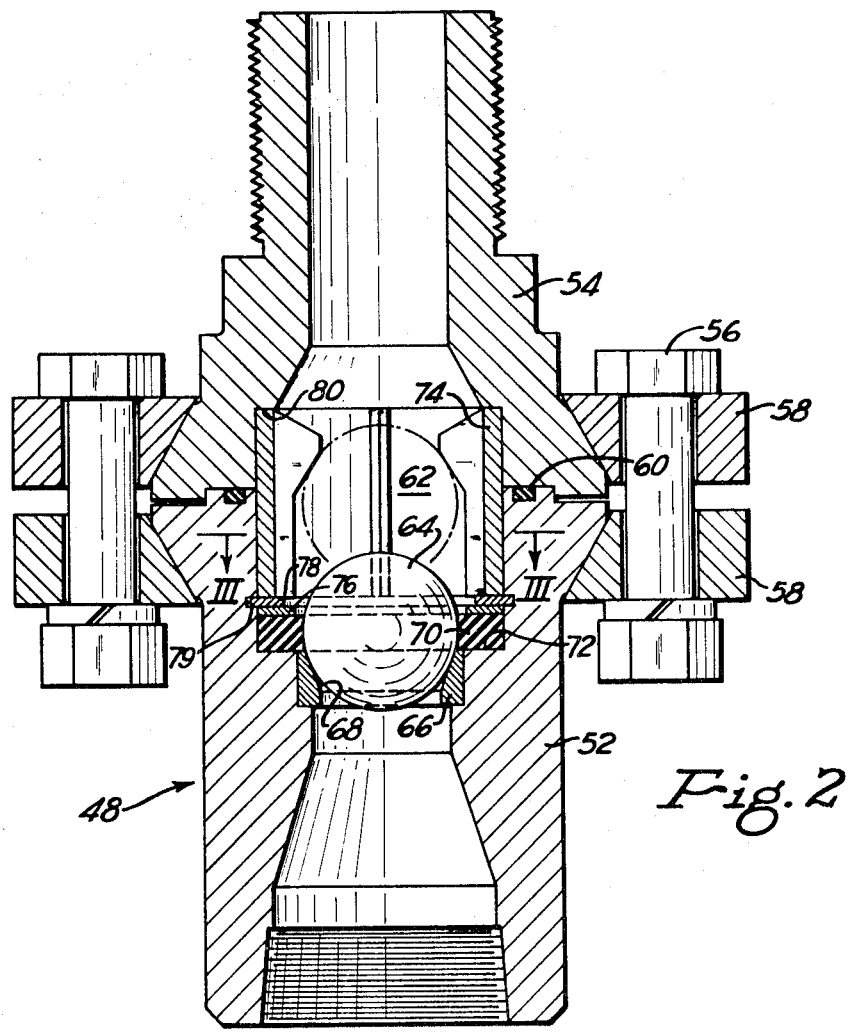
Fig. 2
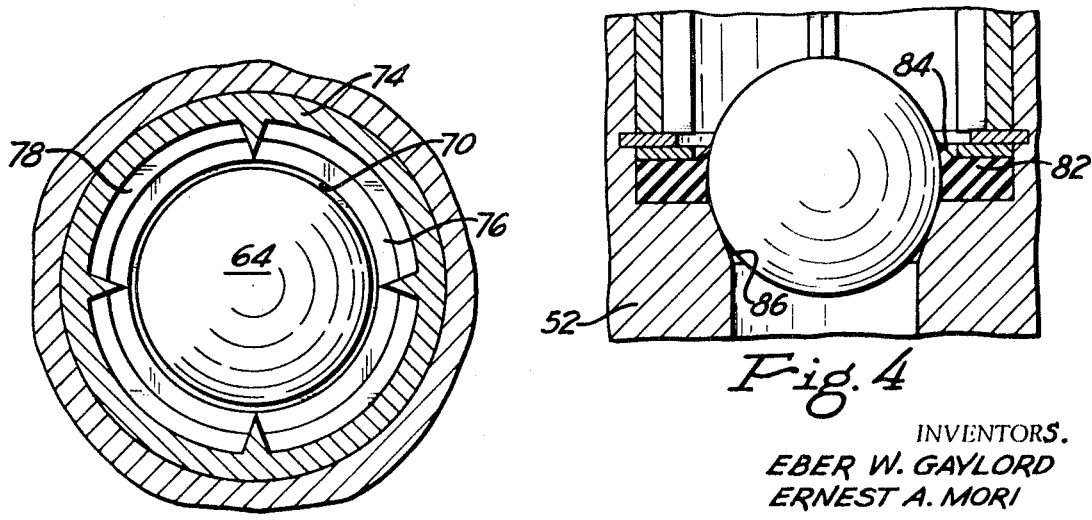
Fig. 3
Fig. 4
INVENTORS.
EBER W. GAYLORD
ERNEST A. MORI

INVENTORS.
EBER W. GAYLORD
ERNEST A. MORI 3,620,653

APPARATUS FOR CONTROLLING SOLIDS-LADEN LIQUIDS

This application is a continuation-in-part of application Ser. No. 723,996 filed on Apr. 25, 1968 by Eber W. Gaylord, Robert J. Goodwin, Ernest A. Mori, and Joseph L. Pekarek, now U.S. Pat. No. 3,561,822.

This invention relates to handling liquids having solid particles suspended therein and more particularly to apparatus for increasing the pressure on such liquids and controlling the flow as the liquid is moved from a low pressure to a high pressure.

Several types of processes use suspensions of solid particles in fluids at high pressures. For example, in the hydraulic fracturing process used to stimulate flow from oil and gas-bearing formations into wells, propping agents are suspended in a liquid which is pumped down the well and into a fracture in an underground formation. The pressure on the liquid must exceed the pressure caused by the weight of the formation above the fracture to hold the fracture faces apart and permit entry of the propping agent into the fracture.

A recently developed process using suspensions of solid particles in liquid is the hydraulic jet drilling process in which the borehole of a well is drilled by discharging streams of an abrasive-laden liquid at extremely high velocities against the bottom of the borehole to cut into the bottom of the borehole. Slurries ordinarily having a concentration of about 2–10 percent by volume abrasive are usually used in the jet drilling process. Abrasive particles having a size in the range of 30–60 mesh in the U.S. Sieve Series have been found to be highly effective in jet drilling. Pressure drops of the order of 5,000 p.s.i. or more through nozzles in the jet bit used in the hydraulic jet drilling process are required to impart the high velocity necessary for acceptable drilling rates.

The slurry or suspension of solid particles in a liquid at a high pressure is ordinarily obtained to both the hydraulic fracturing and hydraulic jet drilling process by first suspending the particles in a liquid and then passing the suspension through a pump to raise the pressure to the desired level. That technique heretofore has not been wholly satisfactory for raising the pressure on abrasive-laden liquids to the level desired for hydraulic fracturing and hydraulic jet drilling operations. In hydraulic fracturing the maximum size of the propping agent particles has been determined largely by the maximum size that will pass through the valves of the pump. Thus, the pump rather than the optimum conditions for fracturing determines the size of propping agent used.

In the hydraulic jet drilling process the solid particles suspended in the drilling liquid interfere with pump operation primarily because of their abrasive nature rather than because of their size. The abrasive particles cause rapid wear of the pump valves. The leakage resulting from the rapid wear reduces both the volumetric capacity and the maximum capacity produced by the pump.

This invention relates to apparatus for controlling the flow of solids-laden liquids from a zone of low pressure to a zone of high pressure. The apparatus comprises a valve body having an opening extending through it from the inlet to the outlet and a valve seat surrounding the opening. A spherical valve plug is adapted to move freely within the opening in response to the pressure differential through the valve from a closed position on the valve seat to an open position spaced from the valve seat in the direction of the valve outlet. An annular valve seal of elastomeric material on the outlet side of the valve seat engages the spherical valve plug along a great circle of the valve plug when the valve plug is on the seat and wipes solid particles from the surface of the valve plug as the valve plug moves toward the valve seat. The valve seal is precompressed at the time of assembling the valve to maintain stability of dimensions of the elastomeric material and prevent lodging of solid particles between the valve seal and the valve body. This invention also includes mounting the valve on a reciprocating pump in position to minimize the length of the passage from the valve into the pump.

In the drawings:

FIG. 1 of the drawings is an elevational view, partially in vertical section, of an injector for injecting liquids having a high concentration of solid particles suspended therein into a conduit at high pressure.

FIG. 2 is a vertical sectional view of the discharge valve of the injector illustrated in FIG. 1.

FIG. 3 is a transverse sectional view taken along the section line III—III in FIG. 2.

FIG. 4 is a fragmentary longitudinal sectional view of an embodiment of the valve of this invention with a modified seal.

Figure 1:
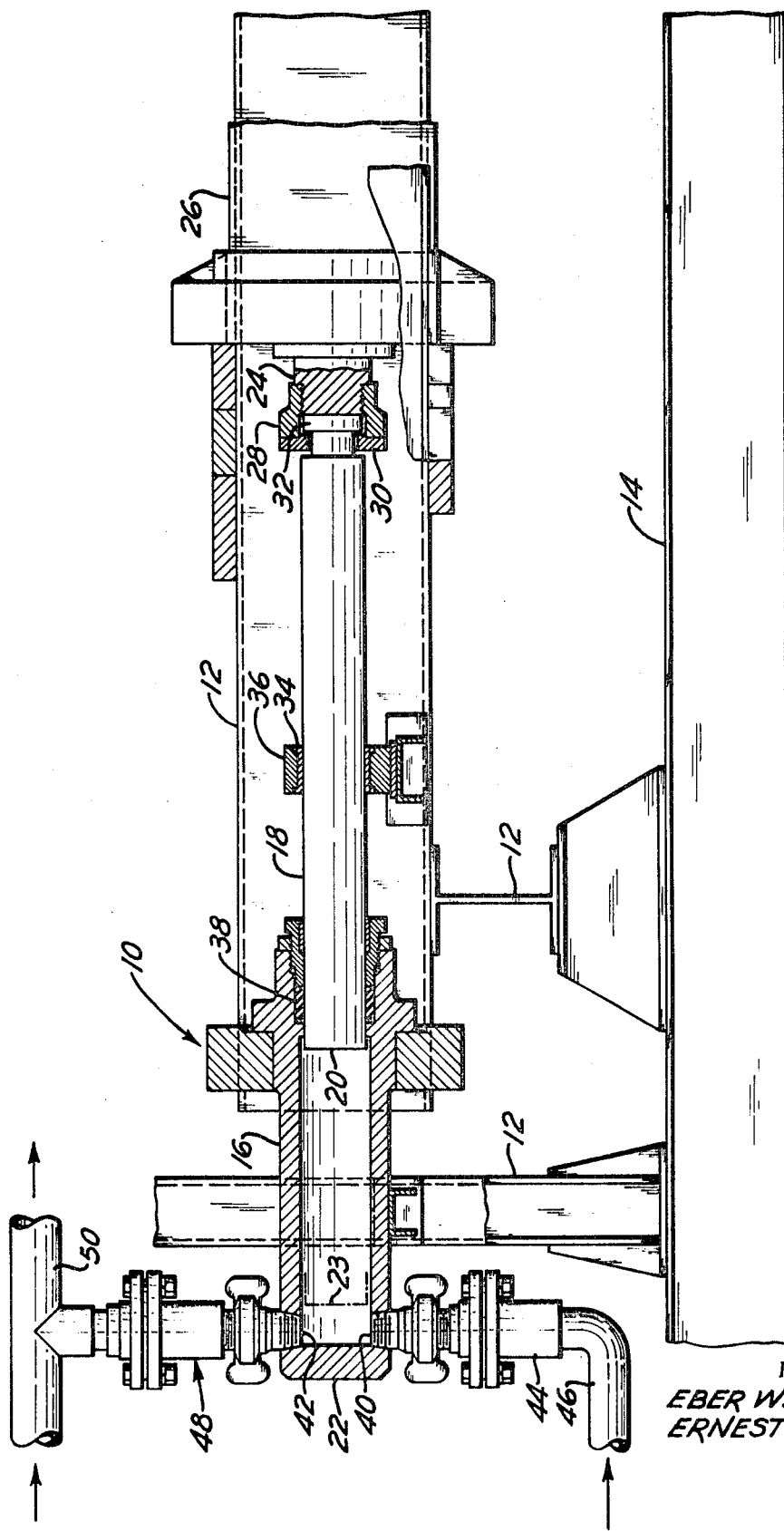

Referring to FIG. 1, an injector 10, useful in hydraulic jet drilling operations, for example, for injecting solid particles into a high-pressure stream of drilling liquids is illustrated mounted on a suitable frame 12 which is supported on skids 14 to facilitate installation at a drilling rig. The injector 10 includes an injector cylinder 16 in which a plunger 18 reciprocates slowly from a withdrawn position illustrated in FIG. 1 to a forward position at which the end 20 of the plunger 18 is spaced slightly from the head end 22 of cylinder 16 as indicated by broken line 23. The end of the plunger 18 opposite end 20 is connected to a piston 24 driven by a conventional hydraulic cylinder 26. Connection of piston 24 to the plunger 18 is made by an adapter 28 and clamp ring 30. Clamp ring 30 overlaps a shoulder 32 on the end of plunger 18 and is held in place on adapter 28 by suitable cap screws, not shown in FIG. 1.

Plunger 18 is supported midway between the hydraulic cylinder 26 and injection cylinder 16 by a bearing 34 mounted in a pillow block 36. A packing gland 38 in the power end of cylinder 16 nearest the hydraulic cylinder 26 engages the plunger to prevent leakage from the injector cylinder 16.

At the head end 22 of the injector cylinder 16 are an inlet 40 and an outlet 42. Connected to the inlet 40 is an inlet valve 44 which is connected at its lower end to a solid particles laden liquid supply line 46. An outlet valve 48 is connected to outlet 42. The novel inlet valve 44 is highly advantageous in handling highly concentrated suspensions of solid particles in a liquid, and is particularly advantageous when used with the slowly reciprocating plunger 18 in cylinder 16. Outlet valve 48 is preferably of the same construction as valve 44. The upper end of the outlet valve 48 is connected to a line 50 containing the fluid under high pressure into which the abrasive particles are to be injected.

FIG. 1 illustrates only one-half the preferred arrangement in which the hydraulic cylinder is double acting to drive a piston which in turn drives a plunger in an injector cylinder corresponding to cylinder 16 at the end of the hydraulic cylinder opposite cylinder 16. Thus, the end of the injector apparatus not shown in FIG. 1 is substantially a mirror image of the apparatus shown in that figure timed 180° out of phase with plunger 18.

Referring to FIG. 2 of the drawings, the outlet valve, indicated generally by reference numeral 48, is shown having a valve body made up of an inlet section 52 and an outlet section 54. The two sections of the valve body are held together by bolts 56 through flanges 58 which engage the tapered outer surfaces of the inlet section 52 and outlet section 54. An O-ring 60 prevents leakage between the inlet section 52 and the outlet section 54 of valve 48.

Both the inlet section 52 and the outlet section 54 have a central opening extending longitudinally through them. The central opening is enlarged in adjacent ends of the valve body sections to form a chamber 62 in which a spherical valve plug 64 moves in response to the direction of the pressure differential within the valve body. A circular valve seat 66 surrounds the central opening through the inlet section 52 of the valve 48. Valve seat 66 is at an angle of 19° to 33° with the axis of the longitudinal passage.

A valve seal 70 of an elastomeric material and rectangular cross section rests on a shoulder 72 surrounding the upper end of valve seat 66. The seal 70 is compressed between shoulder 72 and a metallic washer 76 by a snap ring 78 that fits into a groove 79 in the inner surface of inlet section 52. A valve cage 74 rests on the upper surface of snap ring 78 and is held in place by engagement with a shoulder 80 on the inner surface of outlet section 54. It is essential that valve seal 70 be of substantially rectangular cross section as shown in FIG. 2. Seal 70 should have a thickness of one-fourth to three-quarter inch, depending on the size of the valve.

During the assembly of the valve it is essential to precompress the valve seal under a high pressure, for example, 1,000 p.s.i. or higher, to prevent migration of solid particles between the valve seal 70 and shoulder 72 or between valve seal 70 and ring 76 during the operation of the valve under severe operating conditions. Merely deforming the seal 70 by pushing it into a space provided for the seal does not produce the necessary precompression. The seal must first be placed in position on shoulder 72 and then compressed. Migration of solid particles between the seal and shoulder 72 or the seal and ring 76 deforms the seal and thereby reduces the inner diameter. The valve plug 64 then is not free to move with small pressure differentials, and sticks. Moreover, repeated compression of the seal between the ball valve and the shoulder 72 resulting from reduction of the inner diameter of the seal causes rapid destruction of the seal.

Compression of valve seal 70 under the desired pressure is obtained by suitable engineering of the thickness of the valve seal 70, its hardness, and the position of groove 79 in the valve body. Valve seal 70 is compressed by placing it on shoulder 72, placing washer 76 on its upper surface, placing snap ring 78 on washer 76, and forcing snap ring 78 downward until it snaps into groove 79. In a typical valve structure having a washer 76½ inches wide with an inside diameter of 2¼ inches and an outside diameter of 3¼ inches and utilizing this invention, a force of 5,000 pounds was required to compress the seal sufficiently to place snap ring 78 in alignment with groove 79. Such force resulted in an average pressure of 1,140 p.s.i. under the washer and was adequate to prevent migration of solid particles in a valve operated at a pressure of the order of 10,000 p.s.i. Precompression of the elastomer constituting the seal 70 has the further advantages of stabilizing the dimensions of the seal and reducing changes in such dimensions as the pressure within the valve fluctuates.

Seal 70 is constructed of a tough elastomeric material having a Shore durometer hardness exceeding 80 and preferably in the range of 88 to 98. A suitable elastomeric material is a polyurethane composition identified as PO 652 produced by Armstrong Cork Company, Industrial Product Division. Seal 70 has an inner diameter, after precompression, equal to the diameter of the valve plug 64 and has substantial thickness. For example, a seal having a thickness of one-half inch, measured between the flat surfaces of the seal, has been found to give excellent performance in a valve having a 2-inch spherical valve plug. The seal 70 is positioned in the valve such that its midpoint between the flat surfaces is substantially in alignment with the center of the spherical valve plug when the valve plug is seated in the closed position illustrated in FIG. 2.

It is important that the inner diameter of the annular valve seal 70 to be just equal to or just slightly larger than the diameter of the valve plug 64 when the valve seal 70 is in the precompressed position. The valve seal 70 then engages the valve plug 64 along a great circle of the valve plug when the valve plug 64 is in position on the valve seat. Seal is obtained by the high pressure on the discharge side of valve seal 70 deforming the valve seal 70 against the valve plug 64 after the valve plug is on the valve seat, not by the valve plug moving to compress the elastomeric seal between the valve plug and the valve body. It is this difference in mechanism that is believed to cause the greatly increased life of the valve of this invention compared to valves heretofore available. For this reason, it is important that the valve seal 70 have an inner diameter that allows the valve plug to slide through it. The small clearance between the valve plug and the valve seal has the further advantage of wiping solid particles from the surface of the valve plug that is engaged by the valve seal 70 when the valve is closed. The diameter of the opening of valve seal 70 when in the precompressed condition should range from the diameter of the spherical valve plug to approximately one thirty-second inch larger than the diameter of the valve plug.

In the operation of apparatus illustrated in the drawings, movement of the plunger 18 to the right causes a reduction in pressure within cylinder 16 which causes the pressure drop in chamber 62 to be from the outlet end of valve 48 toward the inlet end of the valve. The valve plug 64 in chamber 62 moves in response to the pressure differential toward the valve seat 68. As the valve plug passes through the seal 70, the seal engages the surface of the valve plug and wipes abrasive particles from it. When the valve plug 64 comes to rest on the valve seat 68, the pressure in the chamber 62 deforms seal 70 against the valve plug. As the plunger 18 moves to the left, the pressure at the inlet end of the valve 48 increases to a pressure higher than the pressure in line 50 and lifts the valve plug 64 from the valve seat 68. The abrasive-laden liquid flows through the central opening of the valve seat around the valve plug 64 and into the outlet of the valve.

While the embodiment of the invention illustrated in FIGS. 2 and 3 is suitable for use as either an inlet valve or outlet valve, the embodiment of the invention illustrated in FIG. 4 is particularly useful as an inlet valve when the liquid supply line is under a low pressure. The embodiment in FIG. 4 differs from that illustrated in FIG. 2 in that the seal, indicated by reference numeral 82 in FIG. 4, has a small lip 84 along the inner edge of its surface nearest the outlet of the valve. The inner diameter of the seal in the embodiment illustrated in FIG. 4 can be such that it loosely fits the maximum diameter of the valve plug. A complete seal is obtained by deformation of the lip 84 against the valve plug by the higher pressure above the seal than below the valve seal when the valve plug is in place on the valve seat. In the embodiment illustrated in FIG. 4, the level of the center of the spherical valve plug when at rest on the valve seat 86 is just below, for example one-eighth inch below, the upper surface of valve seal 82 to reduce the amount of deflection of lip 84 required to seal against the valve plug. It will be noted that the valve seat 86 illustrated in FIG. 4 is a portion of the valve body rather than a separate insert as is illustrated in FIG. 2. The valve plug in the embodiment of the invention illustrated in FIG. 4 moves freely from the valve seat with a very slight pressure differential in the direction of the valve outlet.

Figure 5:
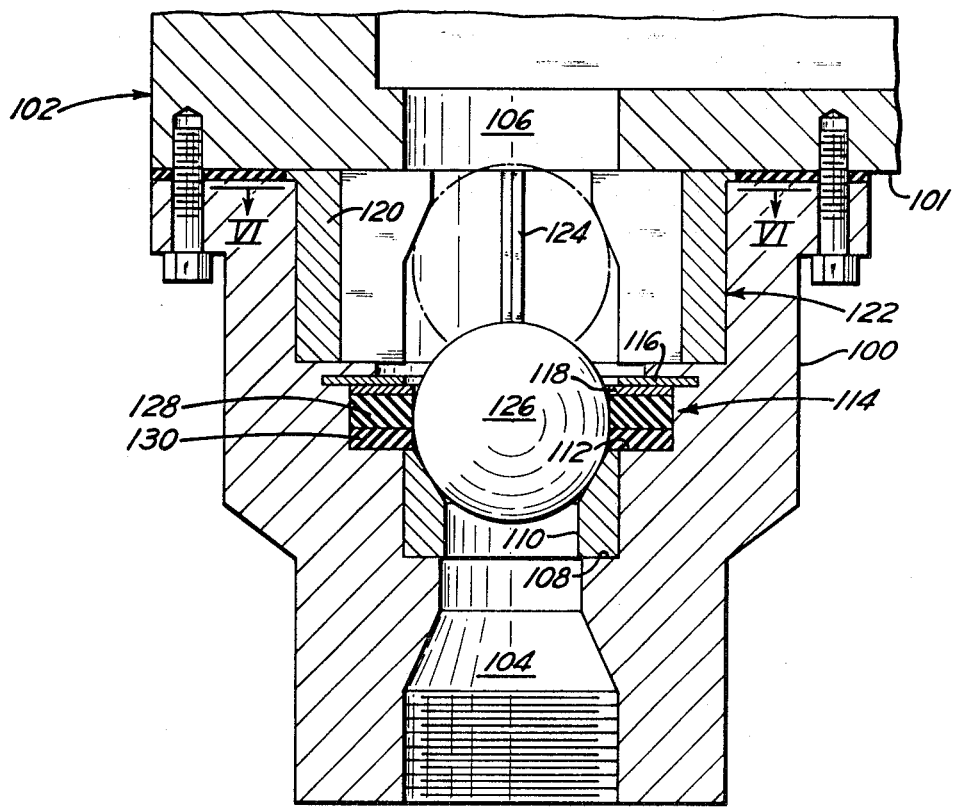
FIG. 5 is a vertical sectional view of another embodiment of this invention connected to an injector.

Referring to FIG. 5, a valve body 100 is shown secured to the cylinder wall 101 of a reciprocating pump 102. The valve body 100 has an opening 104 extending longitudinally through it to communicate with an inlet port 106 in the cylinder wall 102. Mounted on an annular shoulder 108 within the valve body 100 is a valve seat 110 that surrounds the opening 104. The upper end of valve seat 110 is in horizontal alignment with a shoulder 112 on which a seal 114 rests. Seal 114, like seal 70 in FIG. 2, is held in precompressed condition by a snap ring 116 bearing against a washer 118 on the upper surface of the seal 114.

Figure 6:
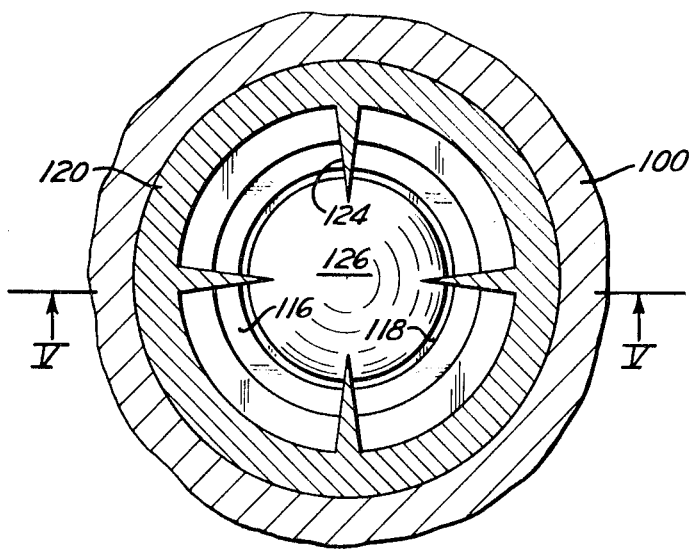
FIG. 6 is a fragmentary horizontal sectional view taken along the section line VI—VI in FIG. 5.

The longitudinal passage 104 is enlarged at the outlet end of the valve adjacent port 106 to receive a valve cage indicated generally by 122. The valve cage 122 consists of a cylinder 120 from which guides 124 extend inwardly to guide the movement of a valve plug 126 from the closed position illustrated in FIG. 5 to the open position indicated by broken lines in FIG. 5. Guides 124 extend inwardly at their upper end to limit upward movement of the valve plug 126 to the position shown in broken lines in FIG. 6. The enlargement of longitudinal opening 104 at the outlet end of the valve is designed to provide an opening between the valve plug 126 and the cylinder 120 of the valve cage having a minimum dimension at least as large as the minimum opening between the valve plug 126 and the seal 114 when the valve plug is in the uppermost position to give adequate room for any solid particles that pass the seal to flow into the inlet port 106.

In the embodiment illustrated in FIG. 5, the valve body is constructed of a single section similar to the inlet section of the valve illustrated in FIG. 2 but is connected directly to cylinder wall 101. The valve plug 126 actually extends a short distance into the inlet port 106 in the cylinder wall 102 of the pump. It is desirable to make the passage between the seal 114 and the cylinder of the pump as short as possible to minimize the length of a column of packed solids that might build up between the cylinder of the pump and the valve seat and prevent flow through the valve on the suction stroke of the pump.

The valve seal 114 illustrated in FIG. 5 is a composite of a ring 128 of a relatively soft elastomeric material mounted on a ring 130 of a harder elastomeric material. The rings 128 and 130 are preferably bonded together to prevent separation and to prevent abrasive particles entering between them. It is preferred that the bonded faces of the two rings be located slightly below the center line of the valve plug 126 when the valve plug is in the closed position on the valve seat 110. In the embodiment illustrated in FIG. 5, the desired location is shown with the upper ring 128 being thicker than the ring 130. As in valve 48, the center line of the spherical valve plug and the center line of the valve seal are preferably in the same horizontal plane. The essential feature of this invention is that the annular valve seal engage the valve plug at the great circle defined by a horizontal plane through the valve plug, or in the embodiment of FIG. 4, above that great circle.

The soft elastomeric material making up ring 128 can have a Shore durometer hardness as low as 60 whereas the hard elastomeric material of which ring 130 is composed has a Shore durometer hardness in the range of about 80 to 98. A preferred urethane composition for ring 130 has a durometer hardness of 88 to 98. The provision of a soft material at the maximum diameter of the valve plug 126 facilitates deformation of the seal against the ball at lower pressures to form a tight seal and quicker releasing of the seal on reversal of the direction of the pressure differential. The hard elastomeric material below the level of the center line of the valve plug 126 deforms slightly against the valve plug when subjected to high pressure above the seal to provide support for the soft elastomeric material but resists extrusion between the valve plug 126 and the upper end of valve seat 110 sufficiently to give a long life. Preferred elastomeric materials are polyurethane compositions of the type described with respect to seal 70 in FIG. 2. An important factor in the life of the seal when subjected to the extrusive forces encountered by rings 130 in pumping abrasive-laden liquids at high pressures is the tear strength. A polyurethane composition of the type referred to and having a durometer hardness of approximately 60 has a tear strength approximately one-tenth the tear strength of a polyurethane composition having a durometer hardness in the 88 to 98 range.

The valve of this invention is useful in handling "dirty" liquids, i.e., liquids having solid particles suspended in them, at relatively low pressures and also up to pressure of 10,000 p.s.i. or more. The seal of the elastomer against the valve plug has been found to protect the valve seat from cutting by abrasive particles. The valve has been found to be highly effective in jet drilling operations in controlling the flow of liquids having a concentration as high as 50 percent by volume of steel shot particles having a size in the range of 35 to 55 in the U.S. Sieve Series. The valve has also demonstrated its ability to handle liquids having propping agent particles as large as one-fourth inch in diameter suspended in them.

In the description of this invention, reference has been made to the use of the valve in combination with an injector. The term injector is used to designate a reciprocating pump operating with a relatively long stroke and a relatively low number of strokes per minute. Injectors are advantageous in handling liquids containing high concentrations such as 50 percent or more solids. This invention is not, however, limited to use on injectors, but can be used on ordinary reciprocating pumps.

Frequently, the pressure on the liquid in the line to the inlet valve is low. It is an advantage of this invention that the force urging the seal and the valve plug together when the valve is closed is derived from the deformation of the seal by the high pressure on the liquid in the outlet end of the valve. Once that pressure is reduced by movement of the piston in the reciprocating pump or injector, the seal releases the valve plug and the valve plug is removed from the closed position on the valve seat by a small pressure differential in the direction of the valve outlet. In some instances it will be advantageous to locate the inlet valve above the reciprocating pump to allow downward flow of liquids having high concentrations of solids suspended in them, or containing solid particles of high density, into the pump. This valve may be used in such arrangements. It may then be desirable to have a helical spring below the valve plug to aid in returning the valve plug to the valve seat during the pressure stroke of the pump.

It is important to minimize extrusion of the seal into the space between the valve plug and the valve seat if rapid wear of the seal is to be avoided when liquid is pumped at high pressures. The hard and tough elastomeric composition having a Shore durometer hardness of 80–98 resists such extrusion. Another factor in reducing the extrusion is the sharply sloping valve seat at an angle of 19° to 33°, and preferably 23° to 30°, with the axis of the longitudinal passage. The sharply sloping valve seat allows the outlet end of the valve seat to have the same diameter as the spherical valve plug or the central opening in the seal with a very small space between the valve seat and valve plug when the valve is closed. The rectangular cross section in a plane parallel to the axis of the longitudinal passage further reduces the space available for such extrusion and contributes to the long life of the seal whereas an O-ring quickly wears out when exposed to solids-laden liquids at high pressures.

We claim:

1. Apparatus for increasing the pressure on a solids-laden liquid comprising a reciprocating pump having a cylinder wall, an inlet port in the cylinder wall, a valve body having an inlet and an outlet, a longitudinal passage through the valve body communicating at the outlet with the inlet port in the cylinder wall, an annular valve seat encircling the longitudinal passage, a spherical valve plug adapted to move from a closed position on the valve seat to an open position adjacent the inlet port, an elastomeric annular seal of rectangular cross section precompressed to a pressure of 1,000 p.s.i. on the outlet end of the valve seat, the opening in the valve seat expanding in the direction of the outlet at an angle of 19° to 33° with the longitudinal passage and having a diameter at the outlet end in the range from the diameter of the valve plug to one thirty-second inch larger than the diameter of the valve plug, said precompressed seal having a diameter of central opening in the range from the diameter of the valve plug to one thirty-second inch larger than the diameter of the valve plug and a thickness such that the seal engages the spherical valve plug around a great circle of the spherical valve plug when the spherical valve plug rests on the valve seat and extends from the valve seat beyond the center of the valve plug, and a valve cage limiting movement of the spherical valve plug into the inlet port.

2. Apparatus as set forth in claim 1 in which the elastomeric seal has a Shore durometer hardness in the range of 80 to 98.

3. Apparatus as set forth in claim 2 in which the elastomeric annular seal has a lip around the inner edge extending in the direction of the outlet of the valve.

14. Apparatus as set forth in claim 1 in which the elastomeric annular seal is a composite of a first ring of a soft elastomeric material having a Shore durometer hardness above 60 and a second ring of a hard elastomeric material having a Shore durometer hardness of 80 to 98, the first ring and the second ring being bonded together and positioned in the valve with the first ring nearest the outlet of the valve, whereby the soft ring engages the valve plug when the valve plug is on the valve seat.

5. Apparatus as set forth in claim 2 in which the elastomeric material is a urethane composition.

7. A valve for controlling the flow of a liquid having solids suspended therein comprising a valve body having a passage extending longitudinally therethrough, a valve seat surrounding the passage within the valve body, an annular seal positioned at the outlet end of the valve seat, said annular seal being of an elastomeric material having a Shore durometer hardness higher than 80 precompressed under a pressure of at least 1,000 p.s.i., a spherical valve plug adapted to move from a closed position on the valve seat to an open position toward the outlet of the longitudinal passage, said valve plug having a diameter such that it just slides along the inner edge of the precompressed annular valve seal as it moves to the closed position.

7. In a ball-type check valve for controlling flow of liquids into and from a reciprocating pump, said valve having a valve body with a passage extending longitudinally therethrough from an inlet to an outlet, a valve seat encircling the passage within the valve body, and a spherical valve plug within the passage on the outlet side of the valve seat adapted to move within the passage between a closed position on the valve seat and an open position spaced from the valve seat in the direction of the outlet, the improvement comprising an annular valve seal of elastomeric material precompressed to a pressure of at least 1,000 p.s.i. on the outlet end of the valve seat, said seal having a substantially rectangular cross section in a plane including the axis of the longitudinal passage, an internal diameter in the range from the diameter of the spherical valve plug up to one thirty-second inch larger than the diameter of the spherical valve plug, and a thickness such that the seal extends from the valve seat in the direction of the valve outlet beyond the center of the valve plug when the valve plug is in the closed position on the valve seat.

8. In a ball-type check valve having a spherical valve plug that moves from the closed position on a valve seat to an open position spaced from the valve seat in the direction of the valve outlet and a precompressed elastomeric annular seal of substantially rectangular cross section and an inner diameter at least as large as the diameter of the valve plug positioned to engage the valve plug along a great circle when the valve plug is in the closed position, the improvement comprising said annular seal being a composite of a ring of elastomeric material having a Shore durometer hardness of at least 80 and a ring of a soft elastomeric material having a hardness of at least 60, the ring of soft material being nearest the outlet of the valve and in position in alignment with the center line of the valve plug when the position valve plug is in the closed position.

9. A valve as set forth in claim 8 in which the ring of soft material extends from above to below the center line of the spherical valve plug when the valve plug is in the closed position.

10. A valve for controlling the flow of solids-laden liquids comprising a valve body, a passage extending longitudinally through the valve body from the inlet end of the valve body to the outlet thereof, an annular valve seat surrounding the passage within the valve body, an annular elastomeric valve seal of substantially rectangular cross section having a Shore durometer hardness of 88 to 98 positioned at the outlet end of the valve seat, said annular seal having an inner diameter at least as large as the diameter of the valve plug and a thickness such that the seal extends in the direction of the outlet beyond the center line of the valve plug when the valve is in the closed position, a valve guide within the longitudinal passage between the annular seal and the valve outlet, the outlet end of the valve guide being in substantially the same plane as the outlet end of the valve body, and a spherical valve plug adapted to move from the closed position on the valve seat to an open position extending into the outlet of the valve.

11. In the ball check valve of claim 7, the improvement comprising the valve seat being at an angle of 19° to 33° with the axis of the longitudinal passage, the annular seal having a thickness of one-fourth inch to three-fourths inch and the central opening in the seal and the diameter of the opening in the outlet end of the valve seat having substantially the same diameter.

12. A ball-type check valve for controlling the flow of slurries at high pressures comprising a valve body having an inlet and an outlet, a passage extending longitudinally through the body from the inlet to the outlet, an annular valve seat encircling the longitudinal passage, said valve seat expanding in the direction of the valve outlet at an angle with the longitudinal passage of 19° to 33°, a spherical valve plug, the opening at the outlet end of the valve seat having a diameter in the range from the diameter of the valve plug to one thirty-second inch larger than the diameter of the valve plug, an annular surface perpendicular to the longitudinal passage and extending radially outward from the opening in the outlet end of the valve seat, an annular elastomeric seal of substantially rectangular cross section and a Shore durometer hardness of 88 to 98 positioned on the surface, compressing means engaging the seal on its outlet face precompressing the seal against the surface at a pressure of at least 1,000 p.s.i., the seal having a thickness such that its outlet face is nearer than the center of the valve plug to the outlet of the valve body, and the opening in the annular seal when precompressed has a diameter in the range from the diameter of the valve plug to one thirty-second inch larger than the diameter of the valve plug, whereby the seal engages the valve plug along the a great circle when pressure within the valve moves the valve plug onto the valve seat.

13. A valve as set forth in claim 12 in which the seal has a lip of triangular cross section in a plane including the longitudinal axis of the valve body, extending from the outlet face along the inner edge of the seal.

14. A valve as set forth in claim 12 in which the compressing means comprise a washer on the outlet face of the seal, a groove in the valve body opening into the longitudinal passage downstream from the seal, and a lock ring engaging the groove and the washer to hold the seal in the compressed condition.

* * * * *